H. J. BRENNECKE.
FLEXIBLE GOGGLES.
APPLICATION FILED AUG. 6, 1915.
1,167,331.
Patented Jan. 4, 1916.
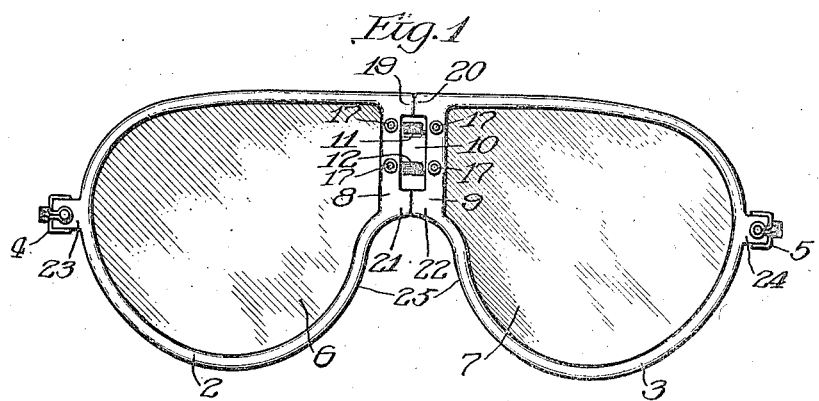
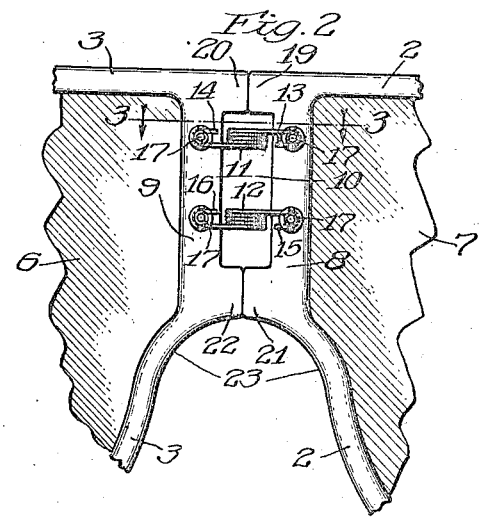
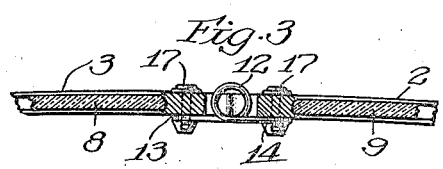
Witness:
R. Bauerle
Inventor:
Herman J. Brennecke
by [signature]
Atty.

UNITED STATES PATENT OFFICE.

HERMAN J. BRENNECKE, OF CHICAGO, ILLINOIS, ASSIGNOR OF ONE-HALF TO ROBERT MALCOLM, OF CHICAGO, ILLINOIS.

FLEXIBLE GOGGLES.

1,167,331.    Specification of Letters Patent.    Patented Jan. 4, 1916.

Application filed August 6, 1915. Serial No. 43,935.

*To all whom it may concern:*

Be it known that I, HERMAN J. BRENNECKE, a citizen of the United States, residing at Chicago, in the county of Cook and State of Illinois, have invented certain new and useful Improvements in Flexible Goggles, of which the following is a specification.

My invention relates to goggle lens connections, and has particular reference to their economical and practically artistic construction.

The object of the present invention is to provide a stable and at the same time flexible joint of serviceably neat appearance adapted for discriminating users, at a low cost of construction.

With this object in view the invention resides in the novel construction, combination and arrangement of parts, all as hereinafter described in detail, illustrated in the accompanying drawing, and particularly defined in the appended claims.

In the drawing—Figure 1 is a front view of a pair of goggles embodying this invention. Fig. 2 is an enlarged rear, or face side, view of the lens connection and of the nose-contacting portion, or nose-piece, the lenses being partly broken away. Fig. 3 is a section taken on line 3—3 of Fig. 2.

In the several views 2 and 3 represent the edges of the lenses whether said edges be separate rims or the edges of rimless lenses, the illustrations in the latter case representing merely thickened or beaded lens edges.

4 and 5 are usual fittings to which the temples or bows are pivoted, and 6 and 7 represent the lens bodies exclusive of the edge portions thereof. The form of construction herein shown contemplates the use, in lieu of rimless construction, of celluloid rims, these rims and the parts thereon being also representative, as stated, of rimless lenses, and have hinge portions 8 and 9, or hinge-leaves minus their pintle. The parts 8 and 9 are the parts of the edge or rim of the lens in each instance which meet. The adjacent edges of the parts 8 and 9 have cut out portions to form a recess 10 which serves as container for coiled springs 11 and 12 the ends of which have loops or eyes 13, 14, 15, and 16 engaged by the usual screws or rivets 17. The formation of the recess 10 leaves an upper pair of abutting lugs 19 and 20 and a lower pair of similar lugs 21 and 22 which produce a substantially continuous edge or rim including both lenses so far as appearance is concerned. The two pairs of lugs form firm mutual supports when held against each other by the springs. The lower lugs also perform the function of a nose-piece or nose-contacting portion of the substantially single two-lens boundary line which includes the parts 2, 3, 8, 9, 19, 20, 21, and 22. Whether the lenses are rimmed or rimless lugs 23 and 24 are provided on which to mount the fittings 4 and 5. The lens edges are curved to provide a nose recess, or a nose-piece 25 which consists of two relatively movable parts. That is, unlike the conventional nose-piece the present nose-piece is in two parts to permit the angularly movable form of goggles to have the nose contacting recess formed in the lenses themselves as in the inexpensive form of goggles which are substantially one piece, or without angularly movable joints. The upper lugs 19 and 20 are arranged to form, like the lower lugs, a substantially continuous line from one lens to the other. The two pairs are substantially two bridge spans.

Having thus described my invention, I claim as new and desire to secure by Letters Patent—

1. The combination with a pair of lenses, of lugs on each lens which contact with similar lugs on the other lens to form a bridge and a coiled spring container-space, and the coiled springs, the latter supporting said lugs against each other.

2. The combination with a pair of lenses of continuous edge or rim portions which at the adjacent portions of said lenses form a nose-piece and mutual support lugs in the upper horizontal plane of said lenses, and a pair of coiled springs between said adjacent edges having ends connecting said edges.

3. The combination with a pair of lenses, of rims or edges therefor which have meeting portions that form a nose-piece or nose-space, and similar meeting portions above the nose-piece portions which balance the latter, and means supporting said meeting portions against each other.

4. The combination with a pair of lenses having on the adjacent portions of the rims or edges upper and lower contacting lugs, and a plurality of coiled spring connections arranged in different horizontal planes between said upper and lower contacting lugs.

5. The combination with the rims or edges of a pair of lenses, of an upper pair of meeting lugs, a lower pair of meeting lugs, the latter forming a nose-contacting portion, and flexible connecting means for said lenses arranged between said upper and said lower pairs of lugs.

6. A pair of lenses having the edges of both lenses form a substantially unbroken endless line which provides a recess for the nose, or nose-piece, and an elastic connection for said lenses.

In testimony whereof I have hereunto signed by name.

HERMAN J. BRENNECKE.